US012011417B2

(12) United States Patent
Kriheli et al.

(10) Patent No.: US 12,011,417 B2
(45) Date of Patent: Jun. 18, 2024

(54) SEPTUM HOLDER WITH MOVEABLE SEPTUM

(71) Applicant: EQUASHIELD MEDICAL LTD., Tefen Industrial Park (IL)

(72) Inventors: Marino Kriheli, Tel Aviv (IL); Eric Shem-Tov, Ramat Hasharon (IL); Raanan Tavor, Yuvalim (IL)

(73) Assignee: EQUASHIELD MEDICAL LTD., Tefen Industrial Park (IL)

(*) Notice: Subject to any disclaimer, the term of this patent is extended or adjusted under 35 U.S.C. 154(b) by 811 days.

(21) Appl. No.: 17/261,286

(22) PCT Filed: Aug. 1, 2019

(86) PCT No.: PCT/IL2019/050871
§ 371 (c)(1),
(2) Date: Jan. 19, 2021

(87) PCT Pub. No.: WO2020/031174
PCT Pub. Date: Feb. 13, 2020

(65) Prior Publication Data
US 2021/0275397 A1 Sep. 9, 2021

(30) Foreign Application Priority Data
Aug. 7, 2018 (IL) .......................................... 261024

(51) Int. Cl.
*A61J 1/20* (2006.01)
*A61J 1/14* (2023.01)

(52) U.S. Cl.
CPC ........... *A61J 1/2096* (2013.01); *A61J 1/1406* (2013.01); *A61J 1/1443* (2013.01); *A61J 1/2003* (2015.05);
(Continued)

(58) Field of Classification Search
CPC ...... A61J 1/1406; A61J 1/1443; A61J 1/2037; A61J 1/2075; A61J 1/2096; A61J 1/065; A61J 1/2003; A61J 1/2006
See application file for complete search history.

(56) References Cited

U.S. PATENT DOCUMENTS 3,987,791 A 10/1976 Chittenden et al.
8,196,614 B2 6/2012 Kriheli
(Continued)

FOREIGN PATENT DOCUMENTS

CN 1509195 A 6/2004
CN 101686896 B 3/2010
(Continued)

OTHER PUBLICATIONS

International Search Report for PCT/IL2019/050871, mailed Nov. 11, 2019 (3 pages).
(Continued)

*Primary Examiner* — John Kim
(74) *Attorney, Agent, or Firm* — Whitestone Law, PLLC

(57) ABSTRACT

Disclosed is a septum holder for use in a connector section of a fluid transfer apparatus for the transfer of a drug from one container to another. The septum holder comprises a body part and a septum support that are moveable in relation to each other. A septum is attached to the septum support. The body part and septum support are configured to be locked to each other at the end of a movement that brings them to their closest positions to each other.

7 Claims, 14 Drawing Sheets

(52) U.S. Cl.
CPC .......... *A61J 1/2006* (2015.05); *A61J 1/2037* (2015.05); *A61J 1/2075* (2015.05)

(56) References Cited

U.S. PATENT DOCUMENTS

| | | | |
|---|---|---|---|
| 2004/0215106 | A1 | 10/2004 | Sampson et al. |
| 2012/0284991 | A1 | 11/2012 | Kusz et al. |
| 2013/0066293 | A1 | 3/2013 | Garfield et al. |
| 2017/0189619 | A1 | 7/2017 | Constantineau et al. |

FOREIGN PATENT DOCUMENTS

| | | | |
|---|---|---|---|
| CN | 107735125 | A | 2/2018 |
| JP | H2500092 | A | 1/1990 |
| WO | 8900131 | A1 | 1/1989 |
| WO | 2013150578 | A1 | 10/2013 |
| WO | 2014/122643 | A1 | 8/2014 |
| WO | 2014/181320 | A1 | 11/2014 |
| WO | 2016/042544 | A1 | 3/2016 |
| WO | 2016/147178 | A1 | 9/2016 |
| WO | 2016/199133 | A1 | 12/2016 |
| WO | 2017183031 | A1 | 10/2017 |
| WO | 2019/147178 | A1 | 8/2019 |

OTHER PUBLICATIONS

Written Opinion of the International Searching Authority for PCT/IL2019/050871, mailed Nov. 11, 2019 (4 pages).

Prior Art

SEPTUM HOLDER WITH MOVEABLE SEPTUM

FIELD OF THE INVENTION

The present invention relates to the field of fluid transfer devices. Particularly, the invention relates to apparatus for the contamination-free transfer of a hazardous drug from one container to another. More particularly, the invention relates to improvements in the connector sections that are used in fluid transfer apparatuses.

BACKGROUND OF THE INVENTION

Advances in medical treatment and improved procedures constantly increase the need for improved apparatus for handling medications in liquid form. The demands relating to variety of types, quality, needle safety, microbial ingress prevention and leak prevention are constantly growing. Additionally, advances in sampling or dose dispensing technologies, automated and manual, aseptic or non-aseptic applications, call for new safe concealing solutions for the sampling needle. One extremely demanding application exists in the field where medical and pharmacological personnel that are involved in the preparation and administration of hazardous drugs suffer the risk of being exposed to drugs and to their vapors, which may escape to the surroundings.

Hazardous drugs in liquid or powder form are contained within vials, and are typically prepared in a separate room by pharmacists provided with protective clothing, a mouth mask, and a laminar flow safety cabinet. A syringe provided with a cannula, i.e. a hollow needle, is used for transferring the drug from a vial. After being prepared, the hazardous drug is added to a solution contained in a bag which is intended for parenteral administration, such as a saline solution intended for intravenous administration.

U.S. Pat. No. 8,196,614 to the applicant of the present application describes closed system liquid transfer devices designed to provide contamination-free transfer of hazardous drugs. FIG. 1 and FIG. 2*a* to FIG. 2*d* are schematic cross-sectional views of an apparatus 10 for transferring hazardous drugs without contaminating the surroundings, according to one embodiment of the apparatus described in this patent. The main features of this apparatus that are relevant to the present invention will be described herein. Additional details can be found in the aforementioned patent.

The proximal section of apparatus 10 is a syringe 12, which is adapted to draw or inject a desired volume of a hazardous drug from a fluid transfer component, e.g. a vial 16 or an intravenous (IV) bag in which it is contained and to subsequently transfer the drug to another fluid transfer component. At the distal end of syringe 12 is connected a connector section 14, which is in turn connected to vial 16 by means of vial adaptor 15.

Syringe 12 of apparatus 10 is comprised of a cylindrical body 18 having a tubular throat 20 that has a considerably smaller diameter than body 18, an annular rubber gasket or stopper assembly 22 fitted on the proximal end of cylindrical body 18, hollow piston rod 24 which sealingly passes through stopper 22, and proximal piston rod cap 26 by which a user can push and pull piston rod 24 up and down through stopper 22. A piston 28 made of an elastomeric material is securely attached to the distal end of piston rod 24. Cylindrical body 18 is made of a rigid material, e.g. plastic.

Piston 28, which sealingly engages the inner wall of, and is displaceable with respect to, cylindrical body 18 defines two chambers of variable volume: a distal liquid chamber 30 between the distal face of piston 28 and connector section 14 and a proximal air chamber 32 between the proximal face of piston 28 and stopper 22.

Connector section 14 is connected to the throat 20 of syringe 12 by means of a collar which proximally protrudes from the top of connector section 14 and surrounds throat 20. Note that embodiments of the apparatus do not necessarily have a throat 20. In these embodiments syringe 12 and connector section 14 are formed together as a single element at the time of manufacture, or permanently attached together, e.g. by means of glue or welding, or formed with a coupling means, such as threaded engagement or a Luer connector. Connector section 14 comprises a double membrane seal actuator which is moveable in a reciprocating manner from a normal, first configuration in which the needles are concealed when the double membrane seal actuator is disposed in a first, distal position and a second position in which the needles are exposed when the double membrane seal actuator is proximally displaced. Connector section 14 is adapted to be releasably coupled to another fluid transfer component, which can be any fluid container with a standard connector such as a drug vial, intravenous bag, or an intravenous line to produce a "fluid transfer assembly", through which a fluid is transferred from one fluid transfer component to another component.

Connector section 14 comprises a cylindrical, hollow outer body; a distal shoulder portion, which radially protrudes from the body and terminates at the distal end with an opening through which the proximal end of a fluid transfer component is inserted for coupling; a double membrane seal actuator 34, which is reciprocally displaceable within the interior of the body; and one or more resilient arms 35 serving as locking elements, which are connected at a proximal end thereof to an intermediate portion of a cylindrical actuator casing that contains double membrane seal actuator 34. Two hollow needles that function as air conduit 38 and liquid conduit 40 are fixedly retained in needle holder 36, which protrudes into the interior of connector section 14 from a central portion of the top of connector section 14.

Conduits 38 and 40 distally extend from needle holder 36, piercing the upper membrane of actuator 34. The distal ends of conduits 38 and 40 have sharp pointed ends and apertures through which air and liquid can pass into and out of the interiors of the conduits respectively as required during a fluid transfer operation. The proximal end of air conduit 38 extends within the interior of proximal air chamber 32 in syringe 12. In the embodiment shown in FIG. 1, air conduit 38 passes through piston 28 and extends inside of hollow piston rod 24. Air flowing through conduit 38 enters/exits the interior of piston rod 24 and exits/enters to air chamber 32 through an aperture formed at the distal end of piston rod 24 just above piston 28. The proximal end of liquid conduit 40 terminates at the top of or slightly proximally from the top of needle holder 36, so that the liquid conduit will be in fluid communication with the distal liquid chamber 30 via the interior of throat 20 of syringe 12.

Double membrane seal actuator 34 comprises a cylindrical casing that holds a proximal disc shaped membrane 34*a* having a rectangular cross-section and a two level distal membrane 34*b* having a T-shaped cross-section with disc shaped proximal portion and a disc shaped distal portion disposed radially inwards with respect to the proximal portion. The distal portion of the distal membrane 34*b* protrudes distally from actuator 34. Two or more equal length resilient elongated arms 35 are attached to the distal end of the casing of actuator 34. The arms terminate with distal enlarged elements. When actuator 34 is in a first position, the pointed ends of conduits 38 and 40 are retained between the proximal and distal membranes, isolating the ends of conduits 38 and 40 from the surroundings, thereby preventing contamination of the interior of syringe 12 and leakage of a harmful drug contained within its interior to the surroundings.

Vial adaptor 15 is an intermediate connection that is used to connect connector section 14 to a drug vial 16 or any other component having a suitably shaped and dimensioned port. Vial adaptor 15 comprises a disk shaped central piece to which a plurality of circumferential segments, formed with a convex lip on the inner face thereof for facilitating securement to a head portion of a vial 16, are attached at the circumference of the disk and pointing distally away from it and a longitudinal extension projecting proximally from the other side of the disk shaped central piece. Longitudinal extension fits into the opening at the distal end of connector section 14 to allow transfer of the drug as described herein below. The longitudinal extension terminates proximally with a membrane enclosure having a diameter larger than that of the extension. A central opening in the membrane enclosure retains and makes accessible a membrane 15*a*.

Two longitudinal channels, which are internally formed within the longitudinal extension and that extend distally from the membrane in the membrane enclosure, are adapted to receive conduits 38 and 40, respectively. A mechanical guidance mechanism is provided to insure that the conduits 38 and 40 will always enter their designated channel within the longitudinal extension when connector section 14 is mated with vial adaptor 15. The longitudinal extension terminates distally with a spike element 15*b* which protrudes distally. The spike element is formed with openings in communication with the internally formed channels, respectively and openings at its distal pointed end.

Vial 16 has an enlarged circular head portion attached to the main body of the vial with a neck portion. In the center of the head portion is a proximal seal 16*a*, which is adapted to prevent the outward leakage of a drug contained therein. When the head portion of vial 16 is inserted into the collar portion of vial adaptor 15 and a distal force is applied to vial adaptor 15, the spike element 15*b* of the connector section 14 pierces the seal 16*a* of vial 16, to allow the internal channels in the connector section 14 to communicate with the interior of drug vial 16. When this occurs, the circumferential segments at the distal end of the collar portion of the connector section are securely engaged with the head portion of vial 16. After the seal of vial 16 is pierced it seals around the spike preventing the outward leakage of the drug from the vial. At the same time the tops of the internal channels in vial adaptor 15 are sealed by the membrane 15*a* at the top of vial adaptor 15, preventing air or drug from entering or exiting the interior of vial 16.

The procedure for assembling drug transfer apparatus 10 is carried out as shown in FIGS. 2*a* to 2*d*: Step 1—After the vial 16 and vial adaptor 15 have been joined together, with spike element 15*b* penetrating proximal seal 16*a* of the vial, the membrane enclosure of vial adaptor 15 is positioned close to the distal opening of connector section 14, as shown in FIG. 2*a*. Step 2—A double membrane engagement procedure is initiated by distally displacing the body of connector section 14 with an axial motion until the membrane enclosure and longitudinal extension of vial adaptor 15 enters the opening at the distal end of the connector section 14, as shown in FIG. 2*b*. Step 3—the distal membrane 34*b* of actuator 34 is caused to contact and be pressed against the stationary membrane 15*a* of vial adaptor 15 by additional distal displacement of the body of the connector section 14. After the membranes are pressed tightly together the enlarged elements at the ends of the arms of the connector section 14 are squeezed into the more narrow proximal section of connector section 14 thereby holding the membranes pressed together and engaged around the longitudinal extension and under the membrane enclosure of vial adaptor 15, as shown in FIG. 2*c*, thereby preventing disengagement of the double membrane seal actuator 34 from vial adaptor 15. Step 4—Additional distal displacement of the body of connector section 14, as shown in FIG. 2*d*, causes actuator 34 to move proximally relative to the body of the connector section 15 until the tips of conduits 38 and 40 pierce the distal membrane of actuator 34 and the membrane at the top of vial adaptor 15 and are in fluid communication with the interior of vial 16. These four steps are performed by one continuous axial motion as connector section 14 is distally displaced relative to the vial adaptor 15, and they will be reversed to separate connector section 14 from vial adaptor 15 by pulling connector section 14 and vial adaptor 15 apart. It is important to emphasize that the procedure is described herein as comprising four separate steps, however this is for ease in describing the procedure only. It is to be realized that in actual practice the secured double membrane engagement (and disengagement) procedure using the present invention is carried out using a single smooth axial movement.

After drug transfer assembly 10 shown in FIG. 1 is assembled as described hereinabove with reference to FIGS. 2*a* to 2*d*, the piston rod 24 can be moved to withdraw liquid from vial 16 or to inject liquid from the syringe into the vial. The transfer of liquid between the distal liquid chamber 30 in the syringe 12 and liquid 48 in the vial 16 and transfer of air between the proximal air chamber 32 in the syringe 12 and air 46 in the vial 16 takes place by an internal pressure equalization process in which the same volumes of air and liquid are exchanged by moving through separate channels symbolically shown in FIG. 1 by paths 42 and 44 respectively. This is a closed system which eliminates the possibility of exchange of air or liquid drops or vapor between the interior of assembly 10 and the surroundings.

In the years since the apparatus 10 described above was invented applicant has made numerous improvements to the components of the apparatus while retaining the basic features and mode of assembly and disassembly as described above.

With respect to connector section 14, several improvements have been made leading up to the present invention. In PCT patent application no. WO2014/122643 is described a solution to a problem that sometimes occurred when using the apparatus.

FIG. 3 is an enlarged view of the prior art connector section 14 of the drug transfer apparatus shown in FIG. 1. As described herein above, when syringe 12 and attached connector section 14 are not connected to another component, the tips of the hollow needles that form the air conduit 38 and liquid conduit 40 reside between the proximal and distal membranes of double membrane seal actuator 34. If the piston rod of the syringe is pushed in a distal direction, then liquid that is in the liquid chamber below the piston of the syringe will be forced out of the opening at the distal end of liquid conduit 40 and can be pushed into the opening at the distal end of air conduit 38 and forced into the air chamber above the piston syringe. If the piston rod is pulled distally, then the opposite flow of air and liquid takes place and air can be forced from the air chamber into the liquid chamber of the syringe.

A solution provided in WO2014/122643 to the applicant of the present application is shown in FIG. 4 and FIG. 5. That solution is a sleeve 64 into which the tip of the needle comprising the air conduit 38 is placed. Sleeve 64 is made of an elastomeric material and is placed inside the double membrane seal actuator 34.

As shown in FIG. 4, when liquid chamber 30 contains liquid and the piston 28 of the syringe is pushed distally the fluid that is forced out of the tip of the liquid conduit 40 creates pressure inside actuator 34 that causes sleeve 64 to be pressed around the tip of the air conduit 38, thus blocking the passage of liquid into the air needle. The harder one pushes on the piston rod—the more effective is the blocking action of the sleeve. Additionally at same time, suction is created in the air chamber of the syringe on the proximal side of piston 28 and in the air conduit 38 causing the sleeve 64 to be pressed even more tightly against the tip of the air conduit, thereby increasing the blocking action.

As shown in FIG. 5, when the piston 28 of the syringe is pulled proximally the liquid conduit 40 is in suction mode, creating vacuum in the interior of actuator 34. At same time the air conduit 38 injects air into the interior of actuator 34 thus air pushing sleeve 64 away from the tip of conduit 38 and expanding its diameter thereby allowing air to flow out of the air conduit 38 into the liquid conduit 40. From FIGS. 4 and 5 it can be seen that a one-way valve operation is taking place, i.e. liquid can't pass to the air channel or air chamber in the syringe, but air can pass to liquid chamber. The ability to draw air into the liquid chamber is purposely desired since it is required for certain manipulations during drug preparation.

FIG. 6 and FIG. 7 show another improvement first described in WO2014/122643 to the prior art double membrane seal actuator shown in FIG. 3. This aspect of the present invention simplifies manufacturing of the double membrane actuator. According to this embodiment, the length of needle holder 36 that fixedly supports the needles that form air conduit 38 and liquid conduit 40 is lengthened and its shape is made cylindrical with a circular cross section. Additionally the proximal membrane 34*a* is removed and is replaced with an O-ring 66 that fits tightly over the exterior of needle holder 36.

FIG. 6 shows the connector section 14 when it is not connected to a vial adaptor 15. In this configuration the O-ring 66 is at the distal end of the needle holder 36 and the tips of the air and liquid conduits are above the lower membrane 34*b* of the actuator. As the connector section and vial adaptor are pushed together, the actuator is pushed in the proximal section with the O-ring 66 sliding up the needle holder 36 until it reaches the proximal end of the connector section and the needles have penetrated the lower membrane 34*b* of the actuator and the membrane at the top of the vial adaptor as shown in FIG. 7.

PCT patent applications WO2014/181320 and WO 2016/042544, both to the applicant of the present application, describe needle valves that can be incorporated into the membrane actuator of the connector section 14. The needle valves prevent the possibility of liquid travel through the air conduit from the distal liquid chamber 30 or vial 16 to the proximal air chamber when the connector section 14 is not connected to a vial or other fluid transfer component. The needle valves also simplify the construction of the membrane actuator making it possible to use a single membrane actuator instead of a double membrane actuator as in the connector section shown in FIGS. 1-4.

FIG. 8 is a schematic cross-sectional view of a connector section 14. In this embodiment the prior art double membrane seal actuator 34 in the connector section 14 that comprises two membranes 34*a* and 34*b* and arms 35 (see FIG. 3) is replaced with an actuator 52 comprising an embodiment of a needle valve 54, only one membrane 34*b*, and arms 35. It is important to note that in this embodiment it is not necessary to seal the proximal end of actuator 52 in any fashion because the task of enclosing the ports 56 at the distal ends of the air and liquid conduits when the connector is not connected to another fluid transfer component, which in the prior art was accomplished by membranes 34*a* and 34*b*, is accomplished in the single membrane actuator 52 by the needle valve arrangement and membrane 34*b* alone and in some embodiments by the needle valve itself.

Referring to FIG. 8, actuator 52 comprises a valve seat 54 comprising two bores through which the needles of air conduit 38 and liquid conduit 40 pass. It is noted that embodiments of actuator 52 are also described that contain one bore for use in liquid transfer apparatus that comprises only one needle 38.

When the syringe and attached connector are not connected to any other component of the apparatus, as shown in FIG. 8, the actuator 52 is at the distal end of connector section 14 and the tips of needles 38 and 40 are located in the bores in the seat 54 of the needle valve. In this configuration the ports 56 in the sides of the needles are blocked by the interior walls of the bores completely isolating the needles from each other, thereby preventing air from entering the liquid chamber of the syringe or liquid from entering the air chamber.

When the syringe and attached connector are connected to another component of the apparatus, such as a vial adaptor, the actuator 52 is pushed towards the proximal end of connector section 14. Since needles 38 and 40 are fixed to the connector 14 by the needle holder 36, as actuator 52 moves proximally, the tips of needles 38 and 40 and ports 56 are pushed out through the distal end of the bores in the seat 54 of the needle valve, through membrane 34*b*, and through the membrane at the top of the vial adaptor, thereby establishing open fluid paths in the respective channels.

The first goal for the connector is to completely eliminate the possibility of migration of liquid to the air chamber. This can happen, for example, if pressure differentials between the air and liquid chambers exist after disconnection from a vial adaptor and if the pressure in the air chamber is lower than that in the liquid chamber, resulting in undesired migration of liquid to the air chamber. The second goal is to prevent leaks or damage to the connector during accidental pushing of the syringe plunger. One of the frequently performed drug transfer operations in hospital settings is known as IV push or bolus injection. Typically the required amount of drug is prepared in a syringe in the hospital pharmacy and delivered to the ward where a qualified nurse administers the drug to the patient through a previously established IV line. A common problem associated with the procedure is that during the trip from pharmacy to ward or at bedside the piston of the syringe is sometimes unintentionally pushed expelling some of the drug from the barrel of the syringe or the piston is unintentionally pulled. High pressures of up to 20 atmospheres can be easily generated by manually pushing the plunger of small volume syringes (1-5 ml). Such pressure may cause the connector to disintegrate or the membranes to be detached. The connector shown in FIG. 8 is proposed as a solution to the problems associated with such unintended transfer of fluids between the air and liquid chambers and to resist high pressures created during accidental pushing the of plunger. As can be seen in the figure, when the connector 14 is not connected to an adapter 15, the ports 56 at the distal end of needles 38 and 40 that allow exchange of fluid between the surroundings and the hollow interiors of the needles are blocked by the interior of the bore in seat 54 of the needle valve. If the syringe is filled or partially filled with liquid, then if a force is exerted to try to push the plunger forward and to force liquid to flow through the needle, no liquid can exit the needle through port 56. Conversely, if a force is exerted to pull the plunger backwards no air can enter through port 56 and flow through the interior of the needle into the barrel of the syringe.

PCT Patent Application WO2016/147178 to the applicant of the present application describes embodiments of septum holders for use in connector sections that are used to connect syringes to other elements of liquid transfer apparatuses. All of the embodiments of the septum holders described in this patent application comprise a septum holder body, at least one resilient elongated arm that terminates with a distal enlarged element attached to the sides of the body, and a septum. The septum holders of WO2016/147178 are characterized in that they comprise at least one bore that functions as the seat of a needle valve. The bore is created in the septum or in an insert fixed in either the body of the septum holder or in the septum. The septum holders described in WO2016/147178 are also characterized in that the septum is attached to the bottom of the body of the septum holder projecting downwards parallel to the at least one elongated arm.

FIG. 9*a*, FIG. 9*b*, and FIG. 9*c* are respectively front, cross-sectional, and exploded views of an embodiment of a septum holder 58 described in WO2016/147178. Septum holder 58 is comprised of a disk shaped annular body 60. Two equal length resilient elongated arms 62 are attached to the sides of body 60. The arms terminate with distal enlarged elements 63. The bottom part of body 60 is comprised of a cylindrical section that projects downward between arms 62. A cavity 166 is created in the bottom part of body 60 into which is fitted an insert 68 comprising two bores 70 that form the seat of a needle valve. In alternative embodiments insert 68 can have different shapes than that shown and in one embodiment can be comprised of one or two separate pieces of tubing that are inserted into parallel bores of appropriate diameters created in the bottom part of body 60.

Septum 72 is made of a single piece of cylindrically shaped resilient material. The upper part of septum 72 has a hollow interior forming a cylindrical recess 74 having an inner diameter no larger than that of the outer diameter of the cylindrical section at the bottom of body 60. After insert 68 is fitted into cavity 166, septum 72 is pushed over the bottom part of body 60 until the solid part of septum 72 below recess 74 butts against the bottom of bores 70 in insert 68 thereby isolating the bottoms of the interior of the bores from the external environment. Septum 72 is fixedly held on the body 60 of septum holder 58 by any means known in the art. For example, the resilient material of the septum may be strong enough to grip the sides of the cylindrical section at the bottom of body 60 to hold the septum in place; or, as shown in FIG. 9*c*, in embodiments of the septum holder the cylindrical section at the bottom of body 60 may have threads or teeth 76, or an equivalent structure created on its outer surface and septum 72 may have similar structure on the inner diameter of its hollow interior (not shown in FIG. 9*c*) so that the two structures interlock when septum 72 is pushed over the bottom part of body 60. In other embodiments other methods, such as gluing, ultrasonic forming, or laser or ultrasound welding are used.

FIG. 9*d* schematically shows the septum holder of FIG. 9*a*, FIG. 9*b*, and FIG. 9*c* in a connector section 92 of a closed system liquid transfer apparatus. The connector section 92 is essentially the same as that in the prior art apparatus described herein above. Cylindrical outer housing 78 of the connector section is attached to syringe 12. Two hollow needles, which function respectively as an air conduit 40 and as a liquid conduit 38, are fixedly attached to the upper end of outer housing 78 of the connector section. At the lower end of the needles, adjacent to the pointed distal tips, are ports 56 that allow fluid communication between the exterior and the hollow interiors of the needles. External ridges 88 near the bottom of cylindrical outer housing 78 serve as finger grips for use when attaching the connector section and syringe to other elements of the drug transfer system. Ridges 88 are not essential and can be eliminated or replaced with other means, for example a roughened surface area, to accomplish the same purpose.

A septum holder 58 is located inside of cylindrical outer housing 78 of the connector section. As shown, the distal ends of needles 82,84 are inserted into bores 70 in insert 68 (see FIG. 9*c*). If the insert 68 is made of a flexible material, e.g. silicon, the diameters of bores 70 are smaller than the outer diameter of the shafts of the needles and therefore the resilient material of which the insert is manufactured pushes radially against the shaft of the needle sealing the ports 86. When not connected to another element of a liquid transfer system the distal enlarged elements 63 of arms 62 are engaged in the shoulder portion 90 at the distal end of outer housing 78. As shown in FIG. 9*d*, in this position the tips of the needles are isolated from the outside by septum 72 at the bottom and the walls of the bores 70 pressing radially on the shafts of the needles prevent fluids from entering or exiting the interior of the needles.

Connection of the connector section to a fluid transfer component, e.g. a vial adaptor, a spike adaptor for connection to an IV bag, or a connector for connection to an IV line, is accomplished in the same manner as in the prior art described herein above. When the septum of the fluid transfer component is pushed against septum 72, septum holder 58 begins to move upwards inside outer housing 78 and the tips of the needles begin to exit bores 70 and penetrate the solid material of septum 72. The tips of the needles pass through septum 72 and the septum of the fluid transfer component as septum holder 58 continues to be pushed upwards, thereby establishing air and liquid channels between the element of the liquid transfer system attached to the fluid transfer component and the proximal air chamber and distal liquid chamber in the syringe.

FIG. 10*a* and FIG. 10*b* schematically show embodiments of a septum holder 110 described in WO2016/147178. The septum holders shown in these figures are identical with the exception of the number of resilient arms 118—two arms in FIG. 10*a* and four arms in FIG. 10*b*.

Septum holder 110 is structurally the same as that shown in FIG. 9*a* to FIG. 9*d* with the exception that the arms 118 are attached to the sides of the body in a way that allows them to move in a different manner. Septum holder 110 is comprised of a cylindrically shaped annular body 112. Two (or four) parallel equal length, downward extending, resilient, elongated arms 118 are attached to the sides of body 112. The arms terminate with distal enlarged elements 120. The distal enlarged elements are shaped roughly like a human foot with a rounded outwardly facing rear side and a pointed inwardly facing front side. The bottom section of body 112 is comprised of a cylindrical section that projects downward parallel to arms 118. A cavity is created in the bottom part of body 112 into which is fitted an insert comprising one or two bores that form the seats of needle valves. Ribs 114 or equivalent structure may be present in the interior of body 112 to provide mechanical strength and support to the insert.

Septum 116 is made of a single piece of cylindrically shaped resilient material. The upper part of septum 116 has a hollow interior forming a cylindrical recess having an inner diameter no larger than that of the outer diameter of the cylindrical section at the bottom of body 112. After the insert is fitted into the cavity in body 112, septum 116 is fitted over the cylindrical bottom section of body 112 (much as a knitted cap is pulled over a head) until the bottom of the hollow interior of septum 116 butts against the bottom of the bores in the insert; thereby isolating the bottoms of the interior of the bores from the external environment. Septum 116 is fixedly held facing downward on the body 112 of septum holder 110 by any means known in the art, such as described herein above.

FIG. 11*a* and FIG. 11*b* schematically show the difference between the attachment of the arms to the septum holder of FIG. 9*a* to FIG. 9*d* and the septum holder of FIG. 10*a* and FIG. 10*b*. In FIG. 9*a* a pair of arms is located facing each other on opposite sides of the septum holder. The enlarged elements at the distal end of the arms move back and forth along an extension of a diameter of the circular cross-section of the body of the septum holder in the direction shown by the double headed arrows in FIG. 11*a*. In the septum holder of FIG. 10*a*, a pair of arms is located one alongside the other on the same side of the septum holder. The enlarged elements at the distal end of the arms move back and forth along extensions of parallel chords of the circular cross-section of the body of the septum holder in the directions shown by the double headed arrows in FIG. 11*b*.

It is noted that other septum holders, for example the other embodiments of septum holders described in the above referenced WO2016/147178, can be adapted mutatis mutandis, by locating the arms as described with reference to FIGS. 10*a* and 10*b* as can other septum housings such as those shown in FIG. 3, FIG. 6 and FIG. 8. It is also noted that septum holders similar to those shown in FIG. 10*a* can be manufactured having only one arm or more than four arms. A very stable configuration can be obtained by the use of three arms, although this would be a more complex embodiment to manufacture.

The changes made to the attachment of the arms to the sides of the septum holder that have been described above with respect to FIGS. 10*a* to 11*b* have necessitated a redesign of connector sections that comprise these septum holders.

FIG. 12 schematically shows the exterior of connector section 104, which is described in detail in PCT Patent Application WO2016/199133 to the applicant of the present application. The internal elements of connector section 104, i.e. the septum holder and either one or two needles, are surrounded by an outer housing 140. Outer housing 140 has the shape of a right prism with a generally square cross-section and an open distal (bottom) end into which the proximal end of an adapter component, e.g. a vial adapter, can be inserted. The proximal (upper) part 142 of outer housing 140 can be constructed in many ways in order to connect to a component, e.g. a syringe or an IV line, of a fluid transfer apparatus.

It is a purpose of the present invention to provide an improved septum holder that will overcome a problem in manufacture and sterilization of a product that comprises the septum holders of the prior art.

Further purposes and advantages of this invention will appear as the description proceeds.

SUMMARY OF THE INVENTION

In a first aspect the invention is a septum holder comprising at least two parts. The at least two parts comprise a body part and a septum support that are moveable in relation to each other and a septum attached to the septum support. The body part and septum support are configured to be locked to each other at the end of a movement that brings them to their closest positions to each other.

In embodiments of the septum holder the septum holder is part of a connector section for a liquid transfer apparatus.

In embodiments of the septum holder the body part and the septum support comprise components configured to releasably hold the septum support in an unblocked configuration and to allow it to be moved relative to the body part and to be locked in a blocked configuration.

In embodiments of the septum holder the septum support comprises a septum seat and the body part and septum support comprise openings to accommodate an insert comprising at least one bore that forms the seat of a needle valve.

In embodiments of the septum holder the septum support comprises at least one resilient elongated arm, terminating with a tooth shaped element that projects downward through the body part and the body part comprises projecting elements comprising at least one upper window through their interiors and at least one lower slot or window at their bottom section into which the tooth shaped elements at the bottom of at least one arm of the septum support can enter. The at least one resilient elongated arm is configured to allow the tooth shaped element to click into the upper window to releasably hold the septum holder in the unblocked configuration and to allow the tooth shaped element to click into the lower slot or window to lock the septum holder in the blocked configuration.

In embodiments of the septum holder the septum is attached to the septum support.

In embodiments of the septum holder the septum comprises an upper part comprising a hollow interior in the form of a cylindrical recess having an inner diameter larger than that of the outer diameter of the disk shaped septum seat and a lower part of that extends downward beyond the lower edge of the septum support of the septum holder.

In a second aspect the invention is a connector section for a liquid transfer apparatus. The connector section comprises: an outer body having a proximal end adapted to be attached to syringe and an open distal end; at least one hollow needle fixedly attached to the proximal end of the body of the connector section, the needle having at least one port at its lower end adjacent to its pointed distal tip that allows fluid communication between the exterior and the hollow interior of the needle; and a septum holder located inside of the cylindrical body of the connector section. The septum holder comprises at least two parts. The at least two parts of the septum holder comprise a body part and a septum support that are moveable in relation to each other and a septum attached to the septum support. The body part and septum support are configured to be locked to each other at the end of a movement that brings them to their closest positions to each other.

In embodiments of the connector section the body part and the septum support comprise components configured to releasably hold the septum support in an unblocked configuration and to allow it to be moved relative to the body part and to be locked in a blocked configuration.

In embodiments of the septum holder the septum support comprises a septum seat and the body part and septum support comprise openings to accommodate an insert comprising at least one bore that forms the seat of a needle valve.

In embodiments of the septum holder the septum seat comprises at least one resilient elongated arm, terminating with a tooth shaped element that projects downward through the body part and the body part comprises projecting elements comprising at least one upper window through their interiors and at least one lower slot or window at their bottom section into which the tooth shaped elements at the bottom of at least one arm of the septum support can enter. The at least one resilient elongated arm is configured to allow the tooth shaped element to click into the upper window to releasably hold the septum holder in the unblocked configuration and to allow the tooth shaped element to click into the lower slot or window to lock the septum holder in the blocked configuration.

In embodiments of the septum holder the septum is attached to the septum support.

In embodiments of the septum holder the septum comprises an upper part comprising a hollow interior in the form of a cylindrical recess having an inner diameter larger than that of the outer diameter of the disk shaped septum seat and a lower part of that extends downward beyond the lower edge of the septum support of the septum holder.

In a third aspect the invention is a method for sterilizing a unit for closed transfer of liquids. The unit is comprised of a syringe or any other airtight device for closed transfer of liquids connected to a connector section. The connector section comprises: an outer body having a proximal end adapted to be attached to syringe or airtight device for closed transfer of liquids and an open distal end; at least one hollow needle fixedly attached to the proximal end of the body of the connector section, the needle having at least one port at its lower end adjacent to its pointed distal tip that allows fluid communication between the exterior and the hollow interior of the needle; and a septum holder located inside of the cylindrical body of the connector section. The septum holder comprises at least two parts. The at least two parts of the septum holder comprise a septum support comprising a septum seat and a body part that are moveable in relation to each other. The septum support and the body part comprise openings to accommodate an insert comprising at least one bore into which the least one port at the lower end adjacent to the pointed distal tip of the at least one hollow needle fits to forms a needle valve. The body part and the septum support comprise components configured to releasably hold the septum holder in an unblocked configuration in which the at least one port is outside of the bore in the insert allowing fluid to flow through the hollow needle and to allow the septum support and the body part to be moved to their closest positions relative to each other and to be locked in a blocked configuration in which the at least one port is inside of the bore in the insert blocking the flow of fluid through the hollow needle. The method comprises:

a) arranging the septum holder in its unblocked configuration;
b) sealing the unit in a pack suitable for gas sterilization;
c) placing the pack in a closed container or room;
d) introducing sterilizing gas into the closed container or room;
e) leaving the pack exposed to the sterilizing gas for a period long enough for the gas to enter the pack and enter the inside of the syringe and connector section through the ports adjacent to the pointed distal tip of the needles, thereby sterilizing the syringe and connector section;
f) evacuating the sterilizing gas out of the container or room to draw the sterilizing gas out of the packs and the inside of the syringe and connector section;
g) introducing air to replace the sterilizing gas into the container or room and the packs and the inside of the syringe and connector section, wherein the air inside the pack is sterile; and
h) repeating if necessary steps d through g until reaching a satisfactory level of sterility; wherein, connecting the unit to a second member of a closed system for transfer of liquids by inserting a proximal end of the second member into the open distal end of the body of the connector section causes the septum holder to move within the connector section moving the septum support and the body part to their closest positions relative to each other, thereby locking the septum holder in its blocked configuration.

All the above and other characteristics and advantages of the invention will be further understood through the following illustrative and non-limitative description of embodiments thereof, with reference to the appended drawings.

DETAILED DESCRIPTION OF EMBODIMENTS OF THE INVENTION

One of the products manufactured by the applicant of this patent application is a unit for closed transfer of liquids comprised of a syringe connected to a connector section. These units, after manufacture and assembly, are packed in blister packs and sent to be sterilized before shipment to customers. Sterilization is carried out by placing the blister packs in a closed container or room that is then filled with ethylene oxide. The blister pack is comprised of a thermoplastic front, which is impervious to gas and bacteria, sealed to a paper back, which is impervious to bacteria but allows gas molecules to pass through it. The ethylene oxide gas enters the blister pack through the paper back and enters the inside of the syringe and connector section through the needle openings and sterilizes the syringe and connector section. After a period of time a vacuum is created in the container to draw the sterilizing gas out of the blister packs and then air is introduced into the blister packs, which are then a sterile product ready for use.

Figure 1:
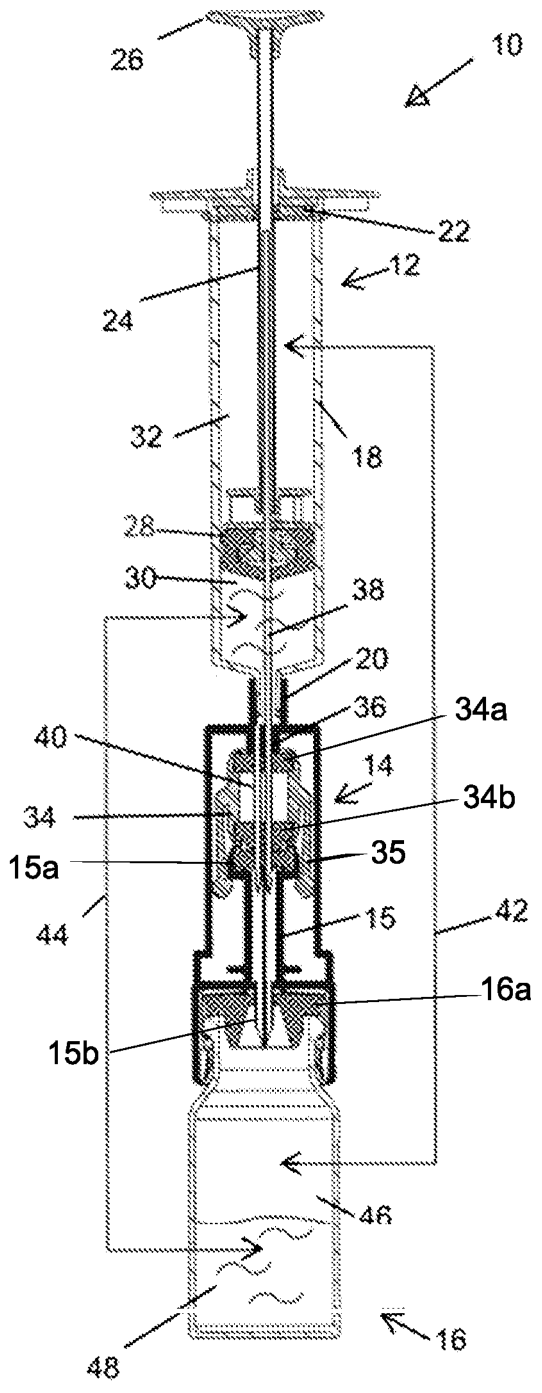
Fig. 1 Prior Art
FIG. 1 is a schematic cross-sectional view of a prior art apparatus for transferring hazardous drugs.
Figure 2A:
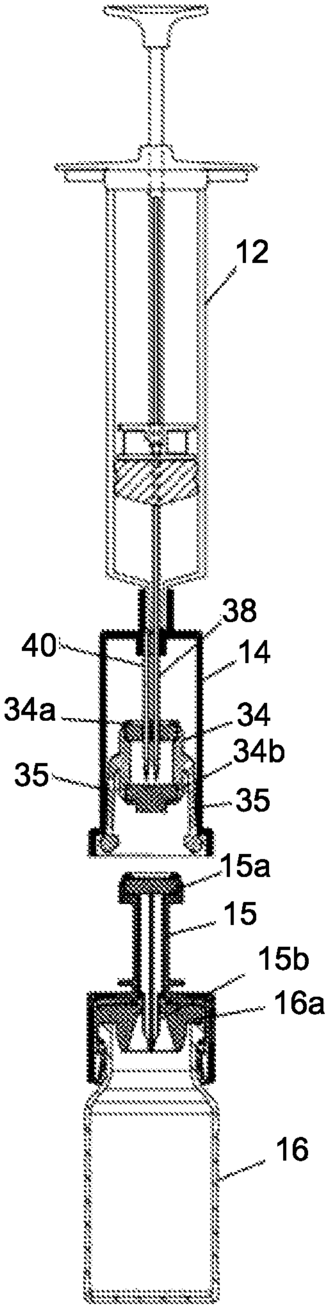
FIG. 2*a* to FIG. 2*d* are cross-sectional views that schematically show the four-step connection sequence between the connector section and the vial adaptor of the apparatus of FIG. 1.
Figure 2B:
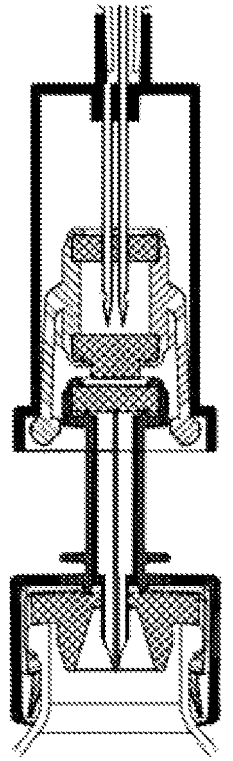
Prior Art Fig. 2b
Figure 2C:
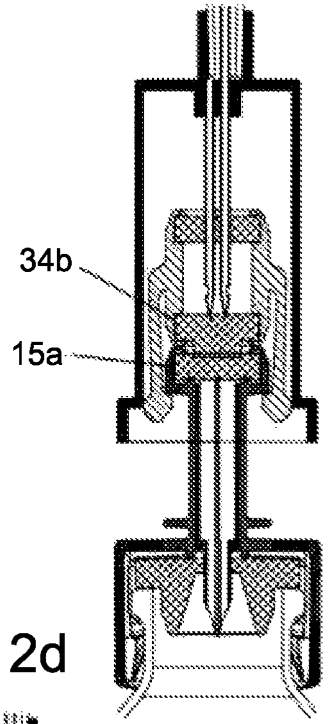
Prior Art Fig. 2c
Figure 2D:
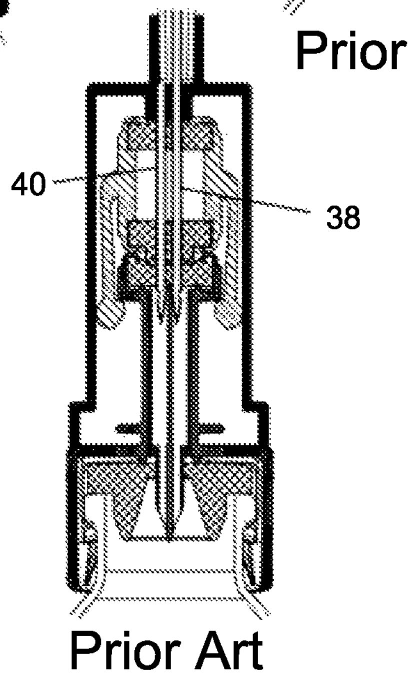
Prior Art Fig. 2d
Figure 3:
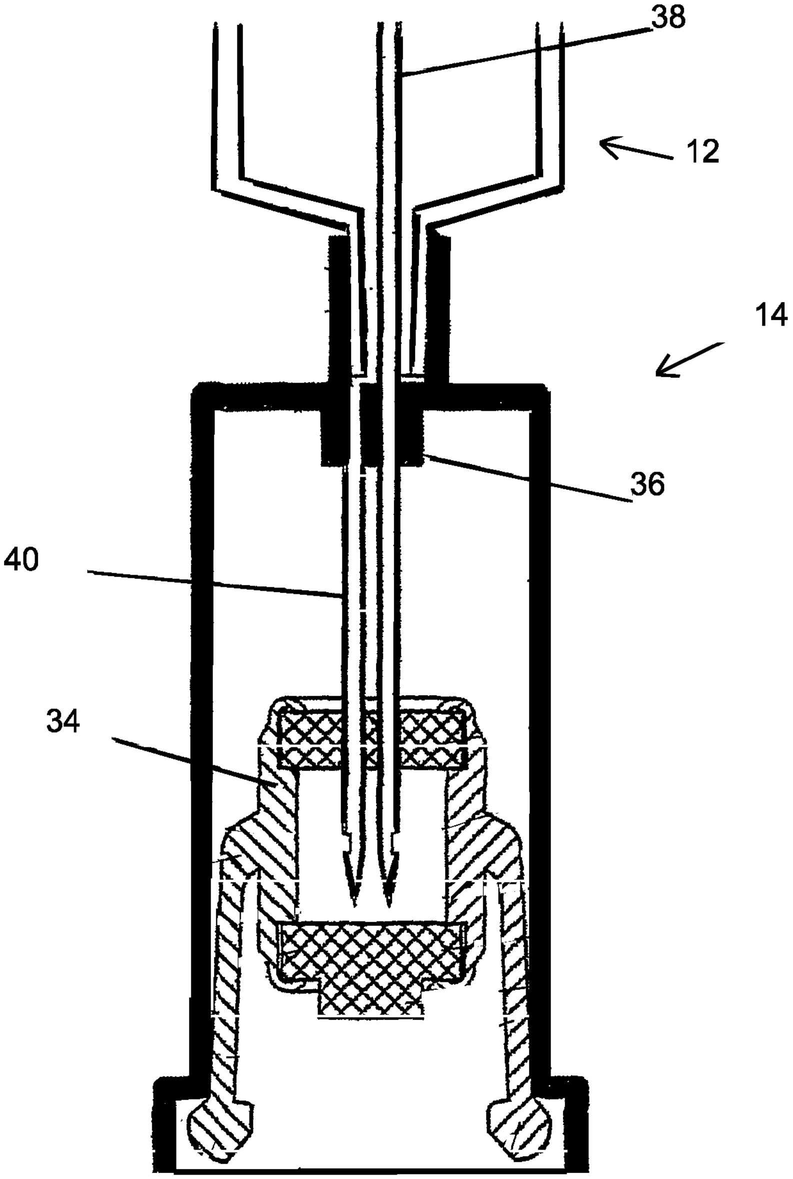
Fig. 3 Prior Art
FIG. 3 is an enlarged view of the prior art double membrane seal actuator shown in FIG. 1.
Figure 4:
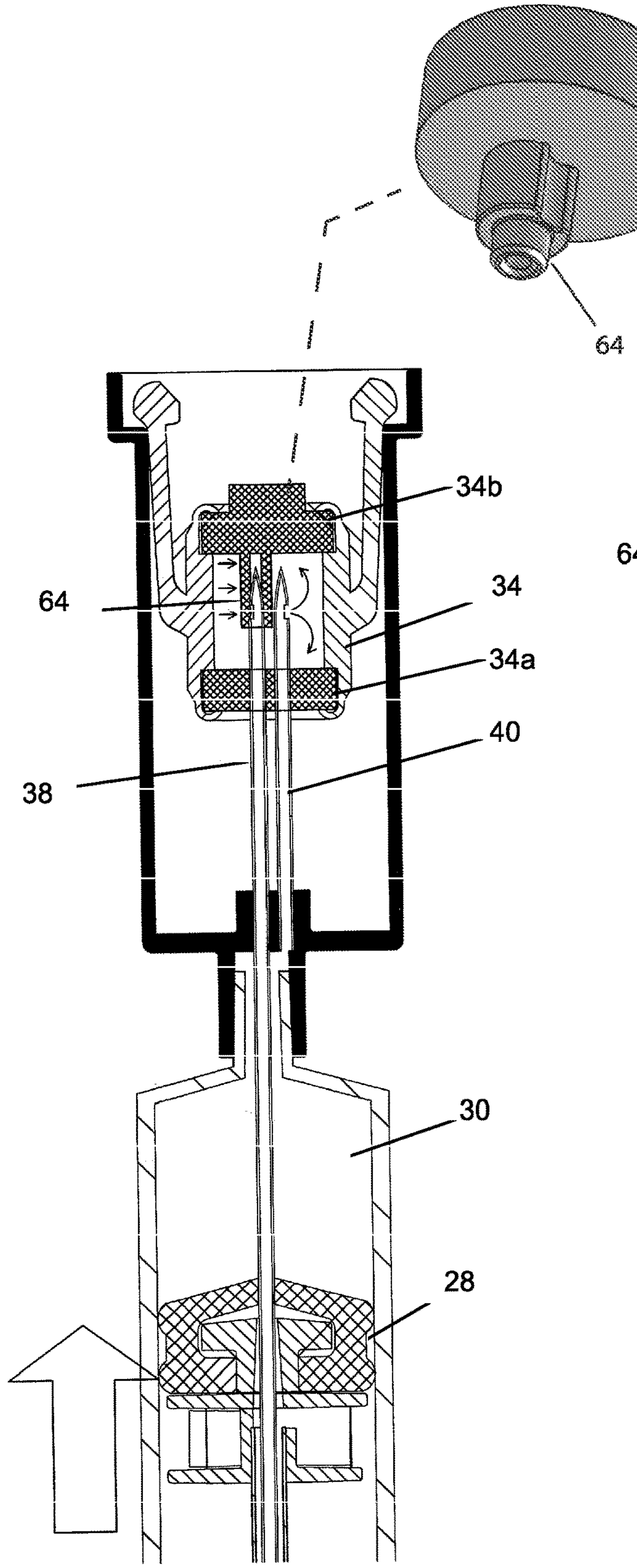
Fig. 4 Prior Art
FIG. 4 and FIG. 5 show an improvement in the double membrane seal actuator of FIG. 3 according to the present invention that prevents the possibility of liquid entering the air channel if the piston rod of the syringe is accidently pushed or pulled.
Figure 5:
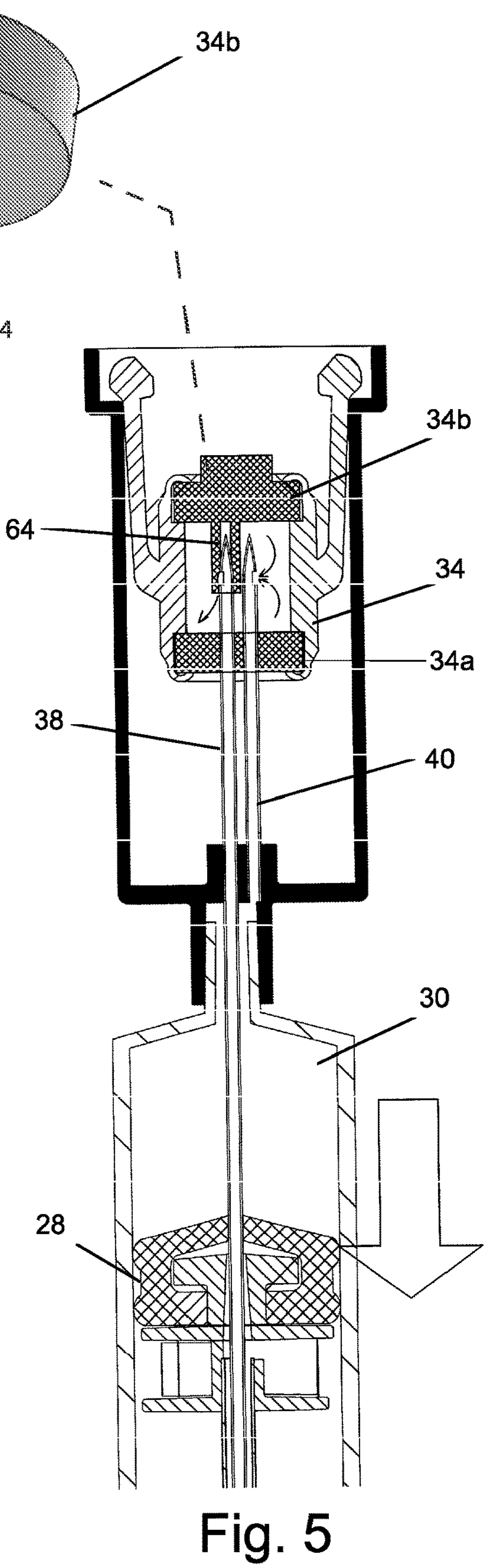
Fig. 5 Prior Art
Figure 7:
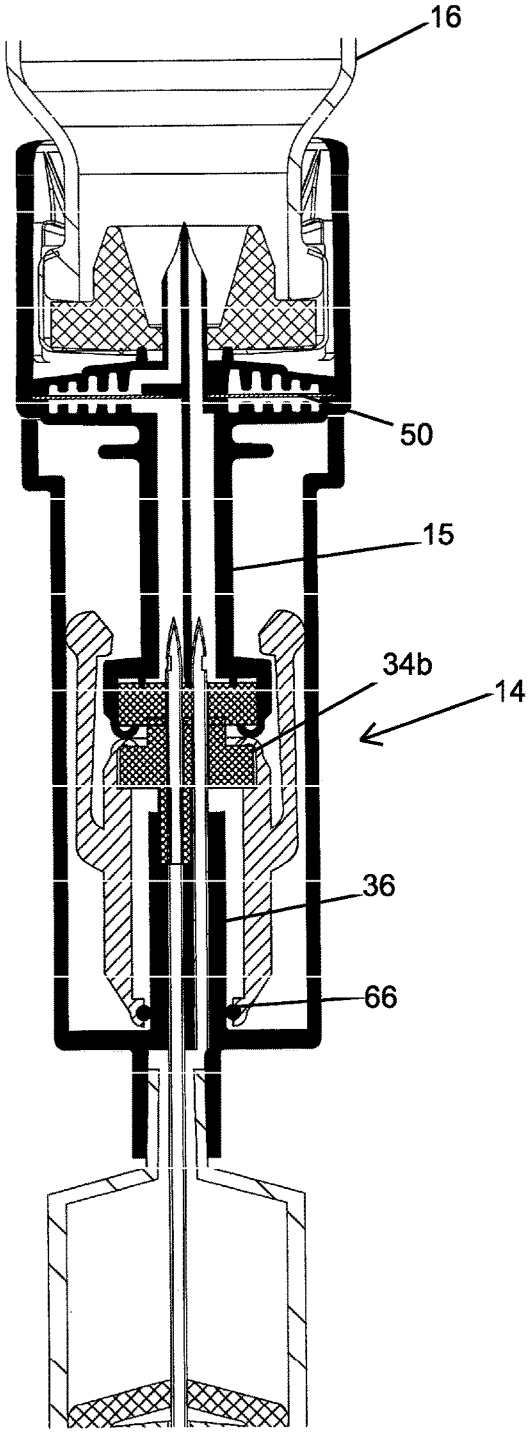
Fig. 7 Prior Art
FIG. 6 and FIG. 7 show an improvement in the double membrane seal actuator of FIG. 3 according to the present invention that simplifies manufacturing of the actuator.
Figure 6:
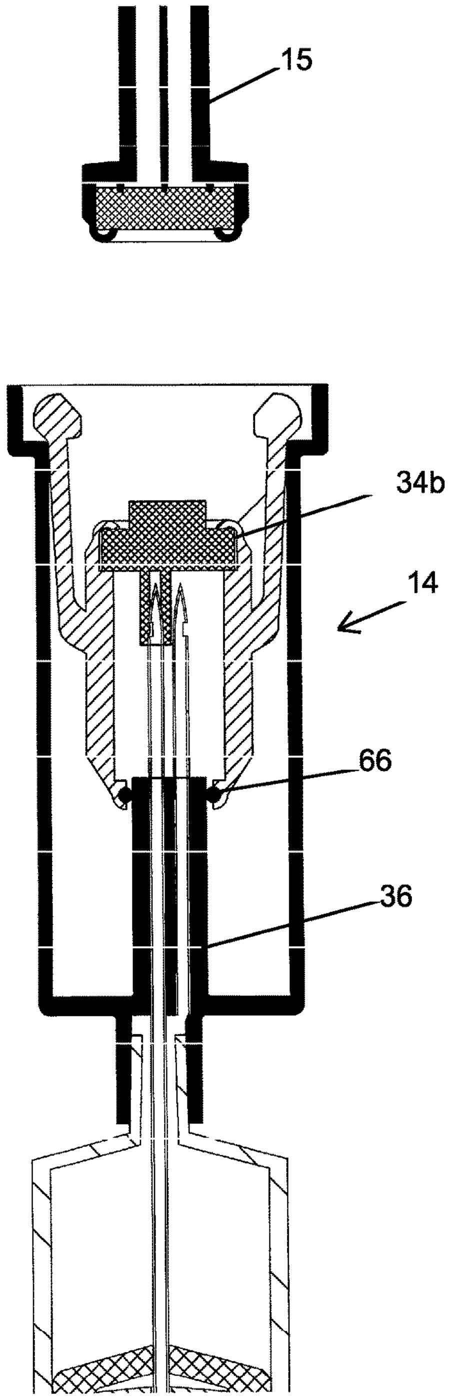
Fig. 6 Prior Art
Figure 8:
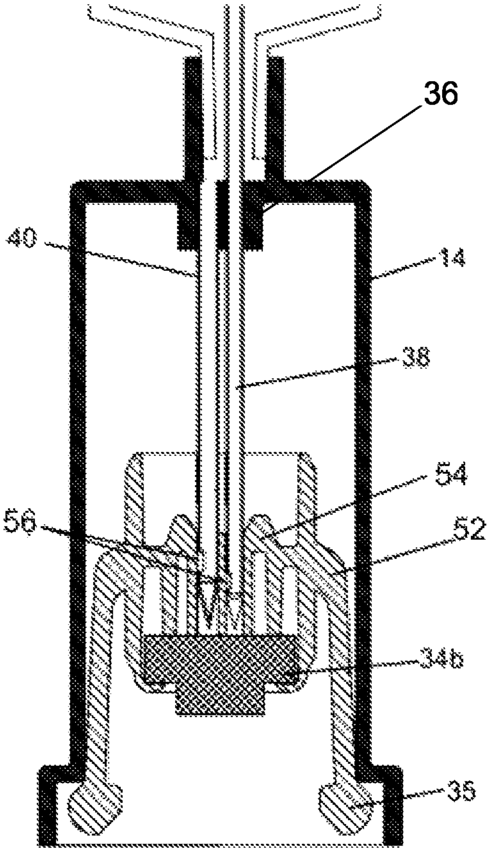
Fig. 8 Prior Art
FIG. 8 is a schematic cross-sectional view of a connector section.
Figure 9A:
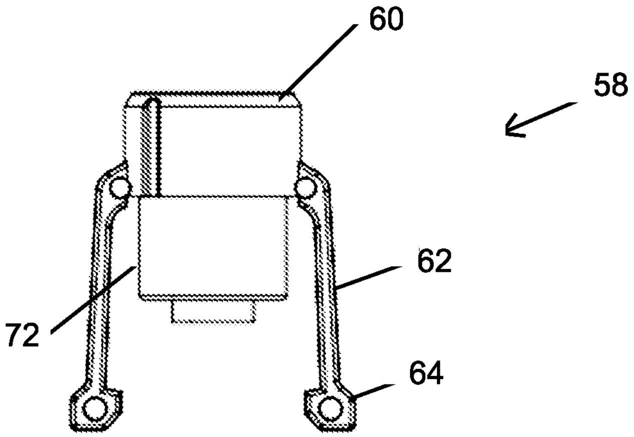
Fig. 9a Prior Art
FIG. 9*a*, FIG. 9*b*, and FIG. 9*c* are respectively front, cross-sectional, and exploded views of a first embodiment of a prior art septum holder.
Figure 9B:
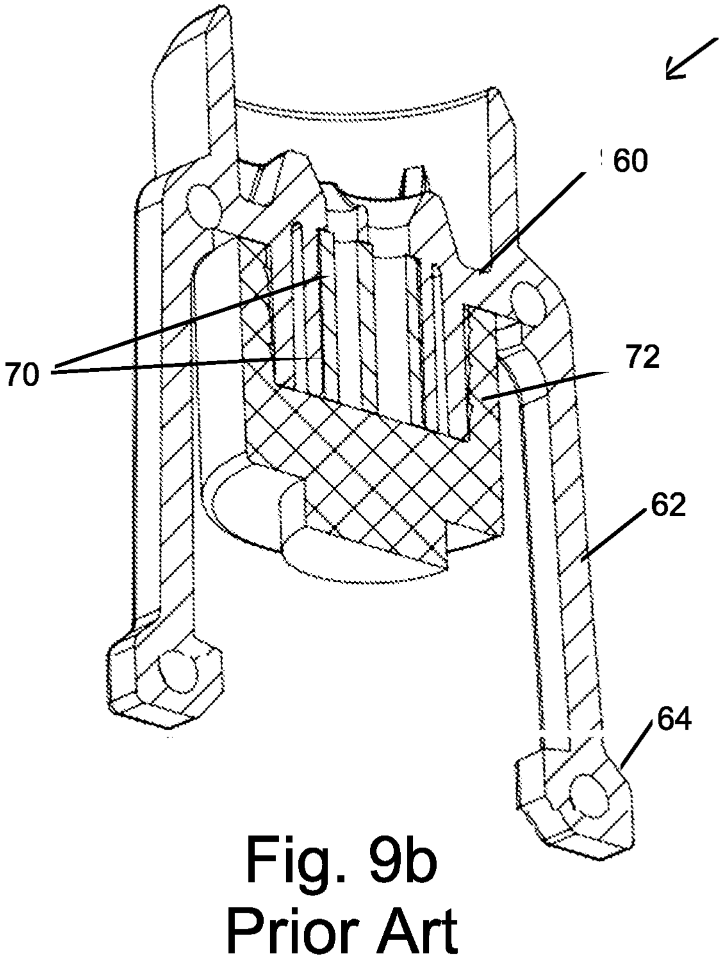
Fig. 9b Prior Art
Figure 9C:
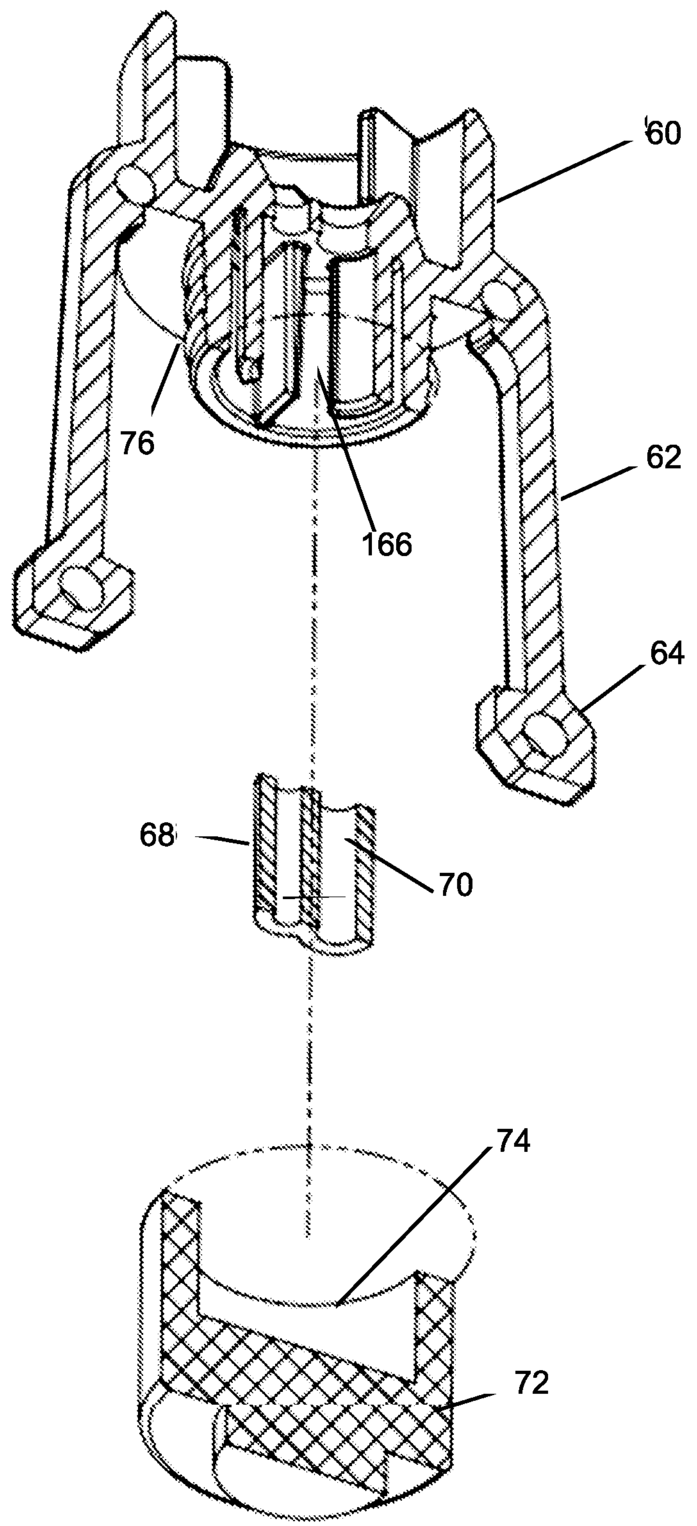
Fig. 9c Prior Art
Figure 9D:
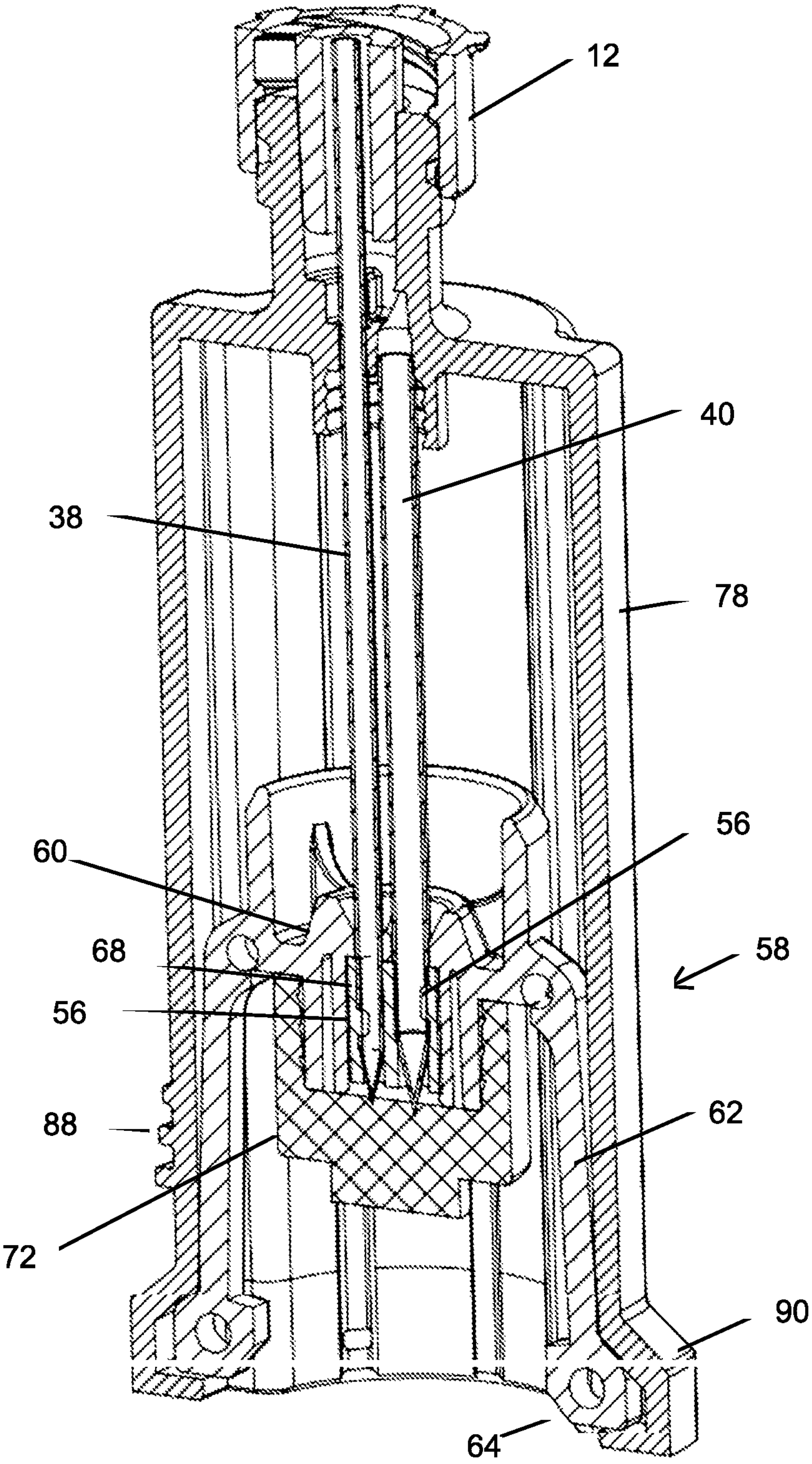
Fig. 9d Prior Art
FIG. 9*d* schematically shows the holder of FIG. 9*a* in a connector section of a closed system drug transfer apparatus.
Figure 10A:
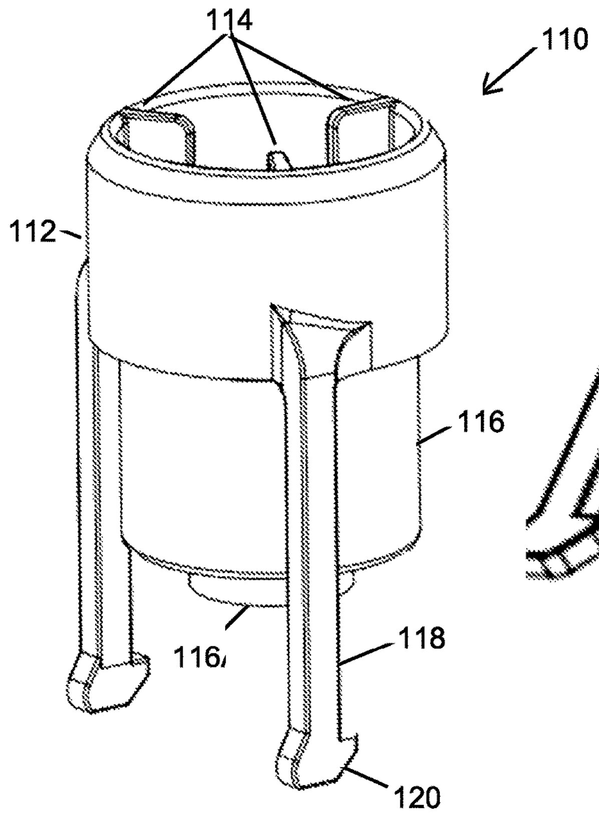
Fig. 10a Prior Art
FIG. 10*a* and FIG. 10*b* schematically show embodiments of a septum holder.
Figure 10B:
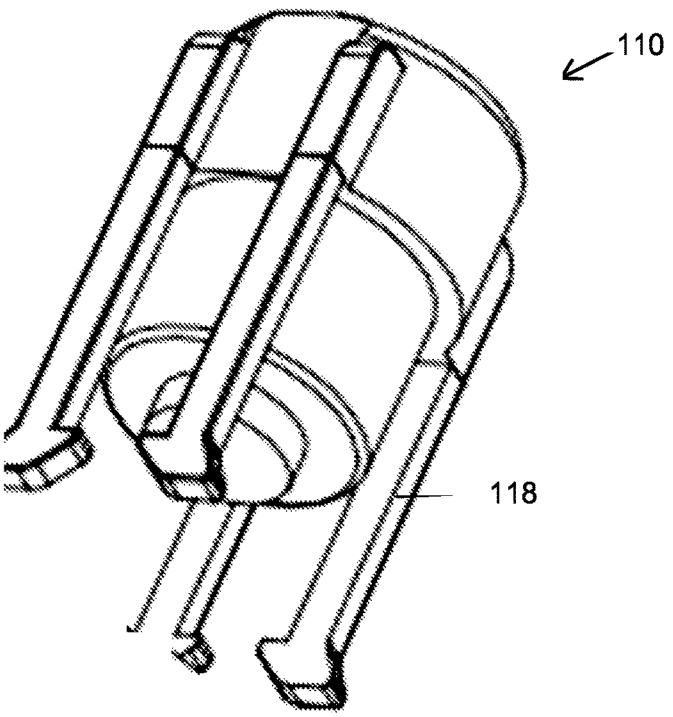
Fig. 10b Prior Art
Figure 11A:
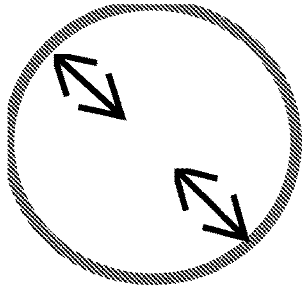
Fig. 11a Prior Art
FIG. 11*a* and FIG. 11*b* schematically show the difference between the attachment of the arms to the septum holder of the prior art and the septum holder of FIG. 10*a;*
Figure 11B:
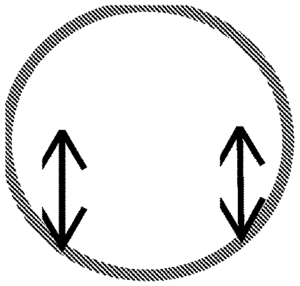
Fig. 11b Prior Art

If the connector section comprises a septum holder such as shown in FIG. 9*d*, the ports 56 at the tips of the air and liquid channels are blocked by the sides of the bores in the insert 68 when the connector section is not connected at its distal end to another element such as a vial adapter. This is the situation when the product described above is placed in the blister pack. Because ports 56 are blocked the sterilizing gas cannot enter the body of the syringe which can't be sterilized, which of course is unacceptable. The current solution to this problem is to seal the syringe and attached connector in the blister pack with the septum holder 58 pulled downwards from the location shown in FIG. 9*d* until the distal enlarged elements 63 of arms 62 are outside of the outer housing 78 of the connector section. In this configuration the ports 56 have been removed from the bores in the insert 68 allowing the sterilizing gas to enter the interior of the syringe and to be replaced with sterile air. After the sterilization process is completed the septum holder is pushed back without opening the blister pack to its correct location with the distal enlarged elements 63 engaged in the shoulder portion 90 at the distal end of outer housing 78, the tips of the needles in the bores 70 in insert 68, and the top of septum 72 sealing the bottom of the bores 70 as shown in FIG. 9*b* and FIG. 9*d*.

After sterilization the boxed product is delivered from the sterilization site to the manufacturing site and the blister packs need to be taken out from the boxes in order to move the septum holder to its correct position and then pack the blisters back into the boxes. Moving the septum holder to its correct position inside the connector section while both are sealed inside the blister pack is a difficult and very time-consuming task that can only be done manually. All of this extra handling adds a great deal of expense to the manufacturing process.

The same problem exists for all embodiments of the prior art connectors shown in the background section of this application.

Figure 12:
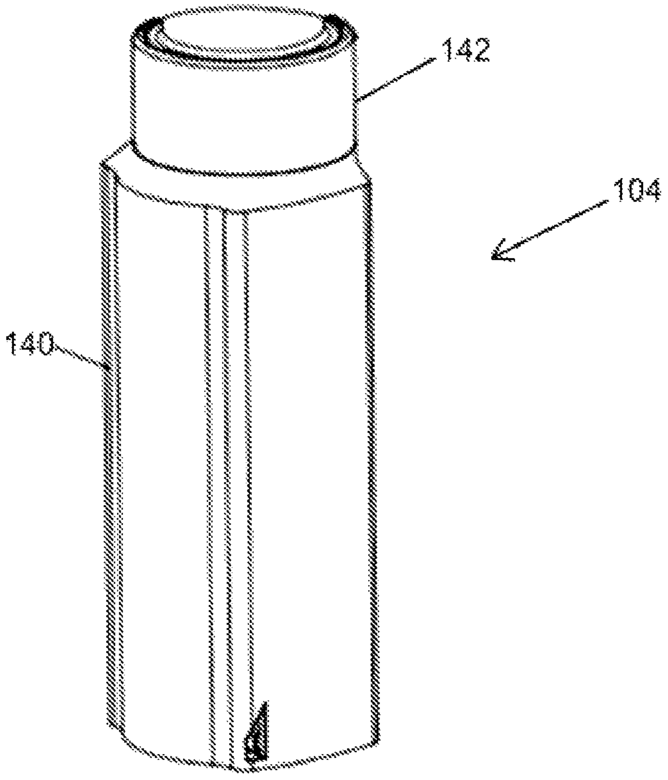
Fig. 12 Prior Art
FIG. 12 schematically shows the exterior of a connector component configured to comprise a septum holder of FIG. 10*a;*

The present invention is a septum holder that was invented to overcome this problem. It can be used, for example in connector section 92 shown in FIG. 9*b* or connector section 104 shown in FIG. 12. The septum holder of this invention comprises a septum and insert that can be moved up and down in the septum holder to alternately block or unblock the ports at the tips of the needles.

Figure 13:
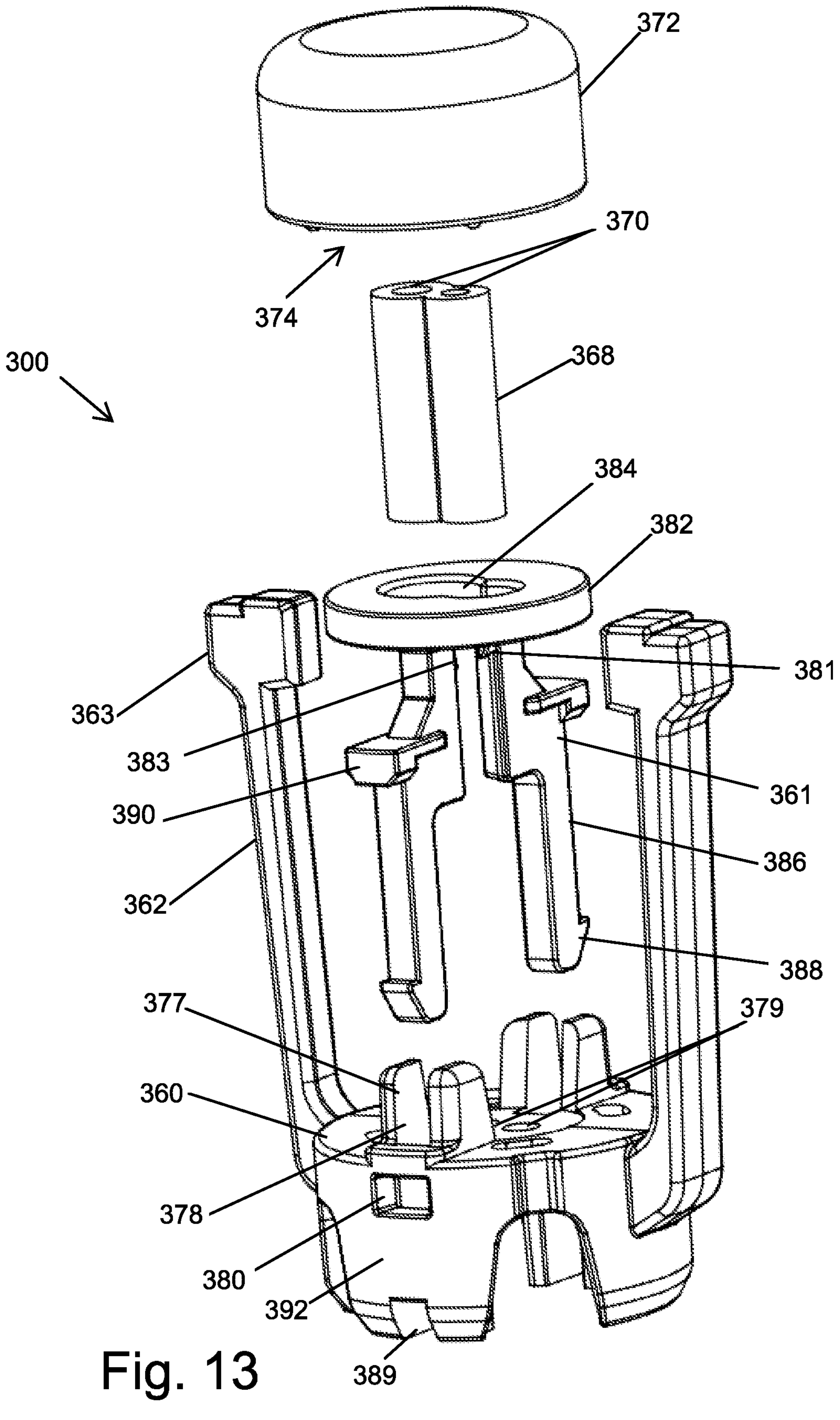
FIG. 13 schematically shows an exploded view of a septum holder according to an embodiment of the invention.

FIG. 13 schematically shows an exploded view of septum holder 300 according to an embodiment of the invention. Septum holder 300 is comprised of a body part 360 and a septum support 361.

Body part 360 comprises a disk shaped upper surface and side elements 392 that project downward from the upper surface. The elements 392 can have other shapes and sizes than those shown in the figures. Two equal length resilient elongated arms 362 that terminate with distal enlarged elements 363 are attached at its sides projecting vertically upwards parallel to each other as shown in FIG. 13. Two pairs of projecting elements 377 project vertically upwards from the upper surface of body part 360. Each pair of projecting elements 377 defines a slot 378 between the elements of the pair. Slots 377 pass vertically downward through the disk shaped upper surface of body part 360. Also seen in FIG. 13 are one of two windows 380 and one of two slots 389 in the elements 392 of body part 360 and holes 379 that pass through the upper surface of body part 360. The functions of windows 380, slots 389 and holes 379 will be described herein below. In embodiments of the invention slots 389 can be replaced with windows near the bottom edge of elements 392.

Septum holder 300 will be described herein as being configured for use in a connector section that comprises two needles that serve as separate air and liquid conduits. Embodiments of septum holder 300 can also be provided mutatis mutandis for use in connector sections that comprise only one needle.

In the embodiment shown in the figures septum support 361 is comprised of a disk shaped septum seat 382 from which two resilient elongated arms 386 projects downward parallel to the arms 362. At the upper end of each arm 386 is an outwardly projecting shoulder 390 and at the lower end of each arm 386 is an outwardly projecting tooth-shaped element 388 having an upper horizontal surface and a lower sloped surface. An insert 368, which in this embodiment comprises two bores 370, forms the seats of two needle valves. Insert 368 passes through opening 384 in septum seat 382 and is attached to septum seat 382 by small spikes 381 and 383 that extend from septum seat 382 into the opening 384 and spike/bite into insert 368 holding it in place. The insert 368 moves up and down in septum holder 300 together with septum seat 382, as will be described herein below. In other embodiments insert 368 can be fastened to septum seat 382 by other means known in the art such as gluing or laser welding or other mechanical fixation.

The septum can be attached to the septum support in many ways. In the specific embodiment shown in the figures septum 372 is made of a single piece of cylindrically shaped resilient material. The lower part of septum 372 has a hollow interior forming a cylindrical recess 374 having an inner diameter larger than that of the outer diameter of septum seat 382. The lower rim of the septum 372 is structured as an inwardly projecting edge 376 (see FIG. 15A) that, when pushed over septum seat 382 to hold septum 372 on septum seat 382. In other embodiments septum 372 can be fastened to septum seat 382 by other means known in the art such as gluing, welding or another type of mechanical fixation.

Figure 14A:
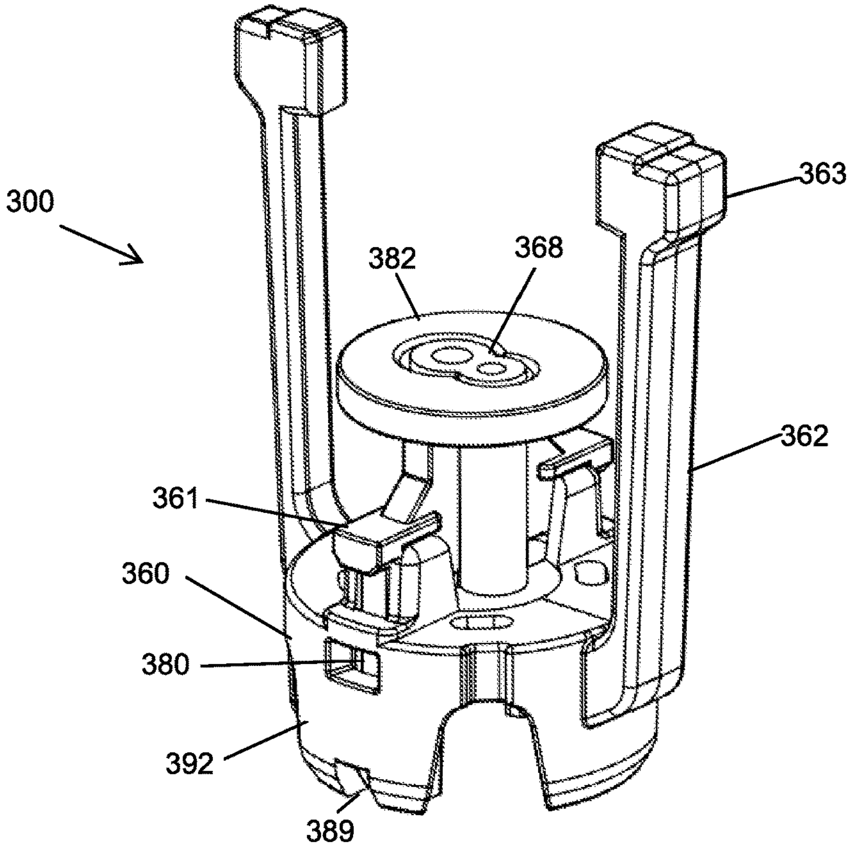
FIG. 14A to FIG. 14C schematically show assembled views pf the septum holder of FIG. 13.
Figure 14B:
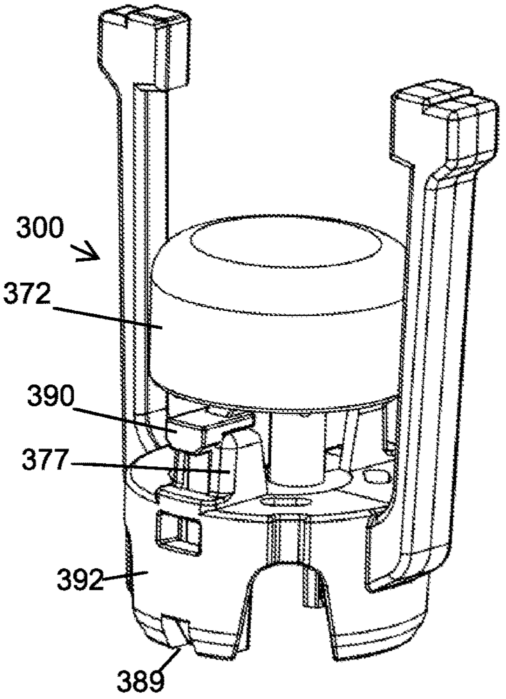
Figure 14C:
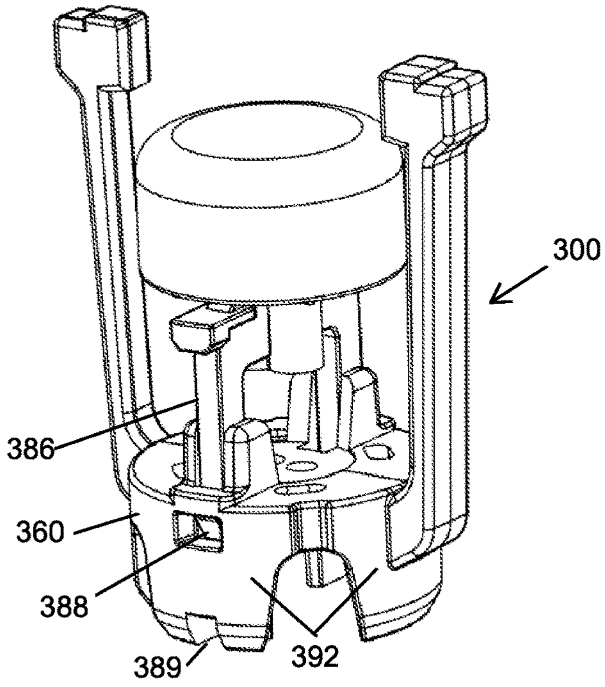

FIG. 14A to FIG. 14C schematically show assembled views of septum holder 300. Because of the length of the arms 386 of septum support 361, septum seat 382 and attached insert 368 and septum 372 can be moved up or down in the septum holder between the two limiting positions defined by shoulders 390 at the top of arms 386 and tooth-shaped elements 388 at the bottom of arms 386. FIG. 14A and FIG. 14B show septum holder 300, respectively without and with septum 372 attached to septum seat 382, in a blocked configuration. FIG. 14C shows septum holder 300 in an unblocked configuration.

In the unblocked configuration septum support 361 has been pushed upwards away from body part 360 until further upward motion of arms 386 in slots 378 was prevented by the tooth-shaped elements 388 at the bottom of arms 386 that click into windows 380. The septum support is releasably held in the unblocked configuration such that a small downward force is enough release the septum support from its unblocked configuration. To move from the unblocked to the blocked configuration shown in FIG. 14A and FIG. 14B septum support 361 is pushed downwards towards body part 360. The sloped bottom surfaces of tooth-shaped elements 388 at the bottom of arms 386 slide out of windows 380 and septum support 361 continues downward until further downward motion of arms 386 through slots 378 is prevented by shoulders 390 contacting the projecting elements 377. When this occurs the tooth shaped elements 388 at the bottom of arms 386 click into slots 389, which then prevents septum holder from being returned to the unblocked configuration.

Figure 15B:
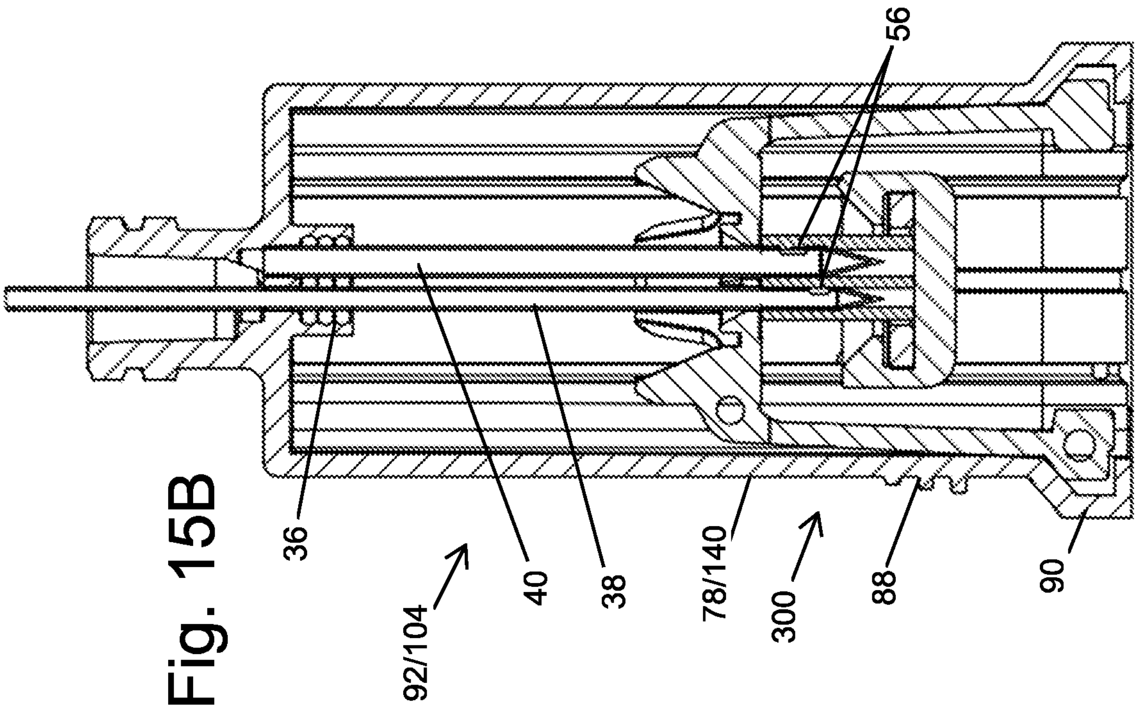
FIG. 15A and FIG. 15B schematically show the septum holder of FIG. 13 respectively in unblocked and blocked configurations in a connector section of a closed system liquid transfer apparatus.
Figure 15A:
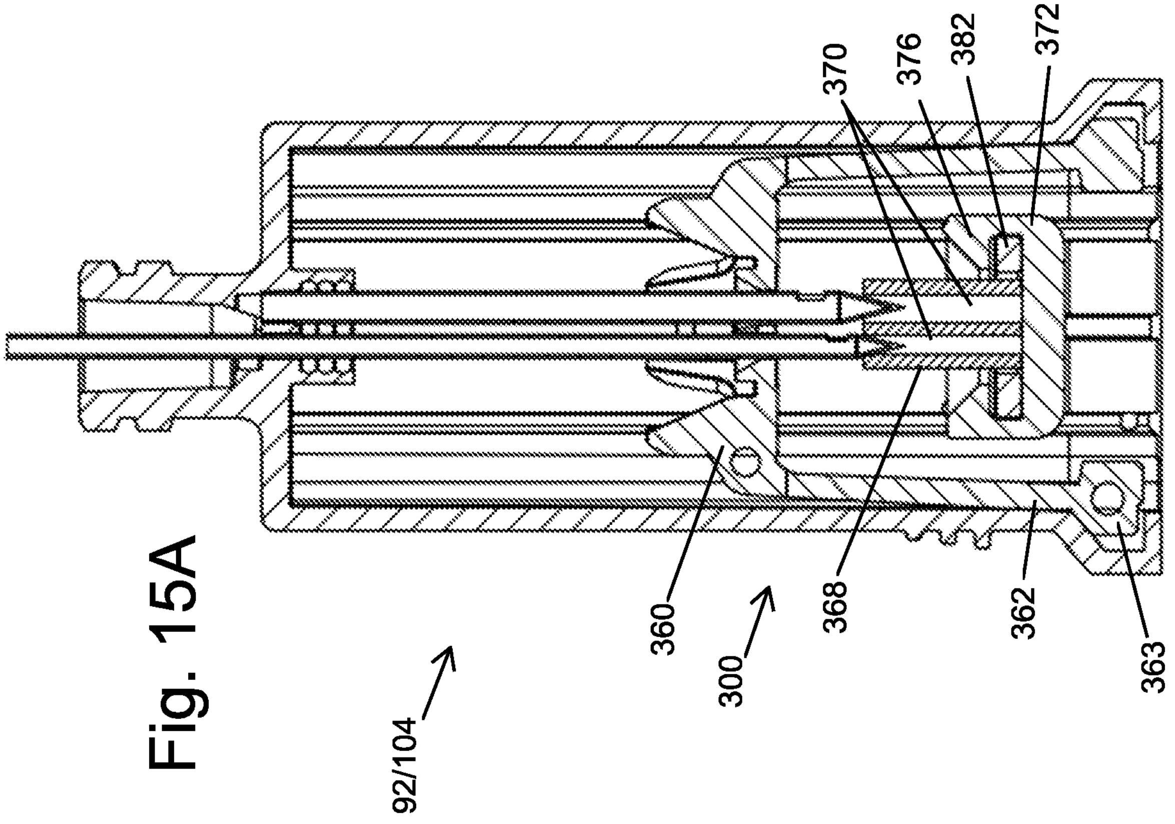

FIG. 15A and FIG. 15B schematically show the septum holder 300 of the invention in a connector section 92/104 of a closed system liquid transfer apparatus. In both figures connector section 92/104 is shown not connected to another component of the liquid transfer apparatus. In FIG. 15A and FIG. 15B connector section 300 is shown respectively in the unblocked and blocked configurations. In the unblocked and blocked configurations shown in FIGS. 15A and 15B the tips and ports 56 of needles 38 and 40 are respectively out of and inside bores 370 in the insert 368 of septum holder 300. The connector section is, with the exception of the septum holder, the same as that in the prior art connector section 92 shown in FIG. 9*b* or connector section 104 shown in FIG. 12 described herein above. Outer housing 78 or 104 of the connector section is configured at its upper end to be connected to another component of the liquid transfer system such as a syringe or an IV line. Two hollow needles, which function as an air conduit 38 and as a liquid conduit 40 respectively, are fixedly attached by needle holder 36 to the upper end of outer housing 78 or 104 of the connector section. At the lower end of the needles, adjacent to the pointed distal tips, are ports 56 that allow fluid communication between the exterior and the hollow interiors of the needles.

After the prior art connector sections described herein as well as those shown in FIGS. 13 to 15C are manufactured a quality control check is carried out by inserting the proximal end of a simulated adapter, such as that used to connect the connector section to a drug vial, intravenous bag, or an intravenous line, into the opening at the distal end of the cylindrical, hollow outer body of the connector section. As in the procedure for assembling the drug transfer apparatus described herein above the simulated adapter is pushed against the septum 372 in the septum holder. This forces the arms 386 of septum support 361, septum seat 382 and attached insert 368 and septum 372 to move up in the septum holder until reaching the blocked configuration shown in FIG. 14A, FIG. 14B and FIG. 15B where the tooth shaped elements 388 at the bottom of arms 386 have clicked into slots 389. As described above, once the blocked configuration is reached the septum holder 300 will forever remain in this configuration. Continue pushing the simulated adapter causes the simulated adapter and the septum holder to become attached to each other by means of distal enlarged elements 363 and the attached septum holder 300 is moved upwards in the connector section until the tips of the needles 38 and 40 exit bores 370 pass through holes 379 in body part 360 and through septum 372. The simulated adapter and attached septum holder are then pulled downwards until the tips of the needles are pulled back through septum 372, through holes 379 in body part 360, and reenter bores 370 blocking ports 56. The elastomeric material of which the septum is made seals the hole as the needle is pulled back through it. Further pulling of the simulated adapter downwards separates it from the septum holder. This process is repeated at least one more time before the quality of the connector section is verified.

The quality control check described above provides an additional benefit. The act of puncturing the septum greatly reduces the amount of force that the end user is required to exert to assemble the drug transfer apparatus in the pharmacy, clinic, or hospital ward. It has been found that a considerable amount of force is needed to puncture the septum the first time. The second time that the needle passes through the septum requires significantly less force than the first time and the third and subsequent times that the needle passes through the septum requires significantly less force than the second time.

After the quality control check described above, a specially designed manufacturing tool unlocks the blocked configuration and units comprised of a syringe connected to a connector section comprising a septum holder 300 are sealed in the blister pack with septum holder 300 in the unblocked configuration as shown in FIG. 14C and FIG. 15A. With the septum in this configuration the tips and ports 56 of the needles are outside of bores 370 in insert 368 and the sterilization procedure can be carried out as required.

After the sterilization procedure is completed the product can be delivered to a customer as is and without the need to be sent to the manufacturing site for moving the septum holder to reseal the ports 56. Resealing of the ports 56 is accomplished automatically at first use when septum support 361 and attached insert 368 are pushed upward from the location shown in FIG. 15A to the location shown in FIG. 15B during first connection of the connector section to a fluid transfer component, e.g. a vial adaptor, a spike adaptor for connection to an IV bag, or a connector for connection to an IV line. After the first connection the ports 56 remain sealed in the blocked configuration in all following connection procedures.

The connection is accomplished in the same manner as in the prior art described herein above. When the septum of the fluid transfer component is pushed against the bottom of septum 372, septum seat 382 and attached insert 368 an septum 372 will move upwards until the distal tips of the needles are fully inserted into the bores 370 in inserts 168. As the connector section and fluid transfer component continue to be pushed together, septum holder 300 begins to move upwards inside outer housing 78/140 and the tips of the needles begin to exit the bottoms of bores 370, pass through holes 379 in body part 360, and penetrate the solid material of septum 372. The tips of the needles pass through septum 372 and the septum at the top of the fluid transfer component as septum holder 300 continues to be pushed upwards, thereby establishing air and liquid channels between the element of the liquid transfer system attached to the fluid transfer component and the proximal air chamber and distal liquid chamber in the syringe.

Although embodiments of the invention have been described by way of illustration, it will be understood that the invention may be carried out with many variations, modifications, and adaptations, without exceeding the scope of the claims.

The invention claimed is:

1. A connector section for a liquid transfer apparatus, the connector section comprising: an outer body having a proximal end adapted to be attached to syringe and an open distal end; at least one hollow needle fixedly attached to the proximal end of the body of the connector section, the needle having at least one port at a lower end thereof adjacent to a pointed distal tip thereof that allows fluid communication between the exterior and the hollow interior of the needle; and a septum holder located inside of the outer body of the connector section, the septum holder comprising at least two parts, wherein the at least two parts of the septum holder comprise a body part and a septum support that are moveable towards and away from ach other, and a septum attached to the septum support, wherein the body part and septum support are configured to be locked to each other at the end of the movement towards ach other in a position in which the septum is closest to the body part wherein the body part releasably holds the septum holder in an unblocked configuration in which a fluid-flow through the at last on port of the hollow needle is allowed, and the movement of the body part and the septum support away from each other is locked in a blocked configuration in which the fluid-flow through the at least one port of the hollow needle is blocked.

2. The connector section of claim 1, wherein the body part and the septum support comprise components configured to releasably hold the septum support in the unblocked configuration and to allow it to be moved relative to the body part and to be locked in the blocked configuration.

3. The connector section according to claim 1, wherein the septum support comprises a septum seat and the septum support comprising opening to accommodate an insert comprising at least one bore that forms a seat of a needle valve.

4. The connector section according to claim 1, wherein the septum support comprises at least one resilient elongated arm, terminating with a tooth shaped element that projects downward through the body part and the body part comprises projecting elements comprising at least one upper window through-h interiors thereof and at least one lower slot or window at bottom section thereof into which the tooth shaped elements at the bottom of at least one arm of the septum support can enter, wherein the at least one resilient elongated arm is configured to allow the tooth shaped element to click into the upper window to releasably hold the septum holder in the unblocked configuration and to allow the tooth shaped element to click into the lower slot or window to lock the septum holder in the blocked configuration.

5. The connector section according to claim 3, wherein the septum is attached to the septum support.

6. The connector section according to claim 5, wherein the septum comprises an upper part comprising a hollow interior in the form of a cylindrical recess having an inner diameter larger than that of the outer diameter of the septum seat and a lower part of that extends downward beyond a lower edge of the septum support of the septum holder.

7. A method for sterilizing a unit for closed transfer of liquids comprised of a syringe or an airtight device for closed transfer of liquids connected to a connector section, the connector section comprising: an outer body having a proximal end adapted to be attached to the syringe or the airtight device for closed transfer of liquids and an open distal end; at least one hollow needle fixedly attached to the proximal end of the body of the connector section, the needle having at least one port at a lower end thereof adjacent to pointed distal tip thereof that allows fluid communication between the exterior and the hollow interior of the needle; and a septum holder located inside of the outer body of the connector section, the septum holder comprising at least two parts, wherein the at least two parts of the septum holder comprise a septum support comprising a septum seat having a septum attached thereto, and a body part that are moveable towards and away from each other; the septum support comprising opening to accommodate an insert comprising at least one bore that forms a seat of a needle valve; wherein the body part and the septum support comprise components configured to releasably hold the septum holder in an unblocked configuration in which the at least one port is outside of the bore in the insert allowing fluid to flow through the hollow needle and to allow the septum support and the body part to be moved towards each other and to be locked in a blocked configuration in which the at least one port is inside of the bore in the insert blocking the flow of fluid through the hollow needle and the septum is closest to the body part;

the method comprising:

a) arranging the septum holder in the unblocked configuration;

b) sealing the unit in a pack suitable for gas sterilization;

c) placing the pack in a closed container or room;

d) introducing sterilizing gas into the closed container or room;

e) leaving the pack exposed to the sterilizing gas for a period long enough for the gas to enter the pack and enter the inside of the syringe and connector section through the ports adjacent to the pointed distal tip of the needles, thereby sterilizing the syringe and connector section;

f) evacuating the sterilizing gas out of the container or room to draw the sterilizing gas out of the packs and the inside of the syringe and connector section;

g) introducing air to replace the sterilizing gas into the container or room and the packs and the inside of the syringe and connector section wherein the air inside the pack is sterile; and h) repeating if necessary steps d through g until reaching a satisfactory level of sterility;

wherein, connecting the unit to a second member of a closed system for transfer of liquids by inserting a proximal end of the second member into the open distal end of the body of the connector section causes the septum holder to move within the connector section moving the septum support and the body part towards each other, and locking the septum holder in the blocked configuration.

* * * * *